No. 894,936.  
PATENTED AUG. 4, 1908.  
R. H. BOWMAN.  
BRAKE ACTUATING LEVER MECHANISM.  
APPLICATION FILED MAR. 10, 1908.
2 SHEETS—SHEET 1.
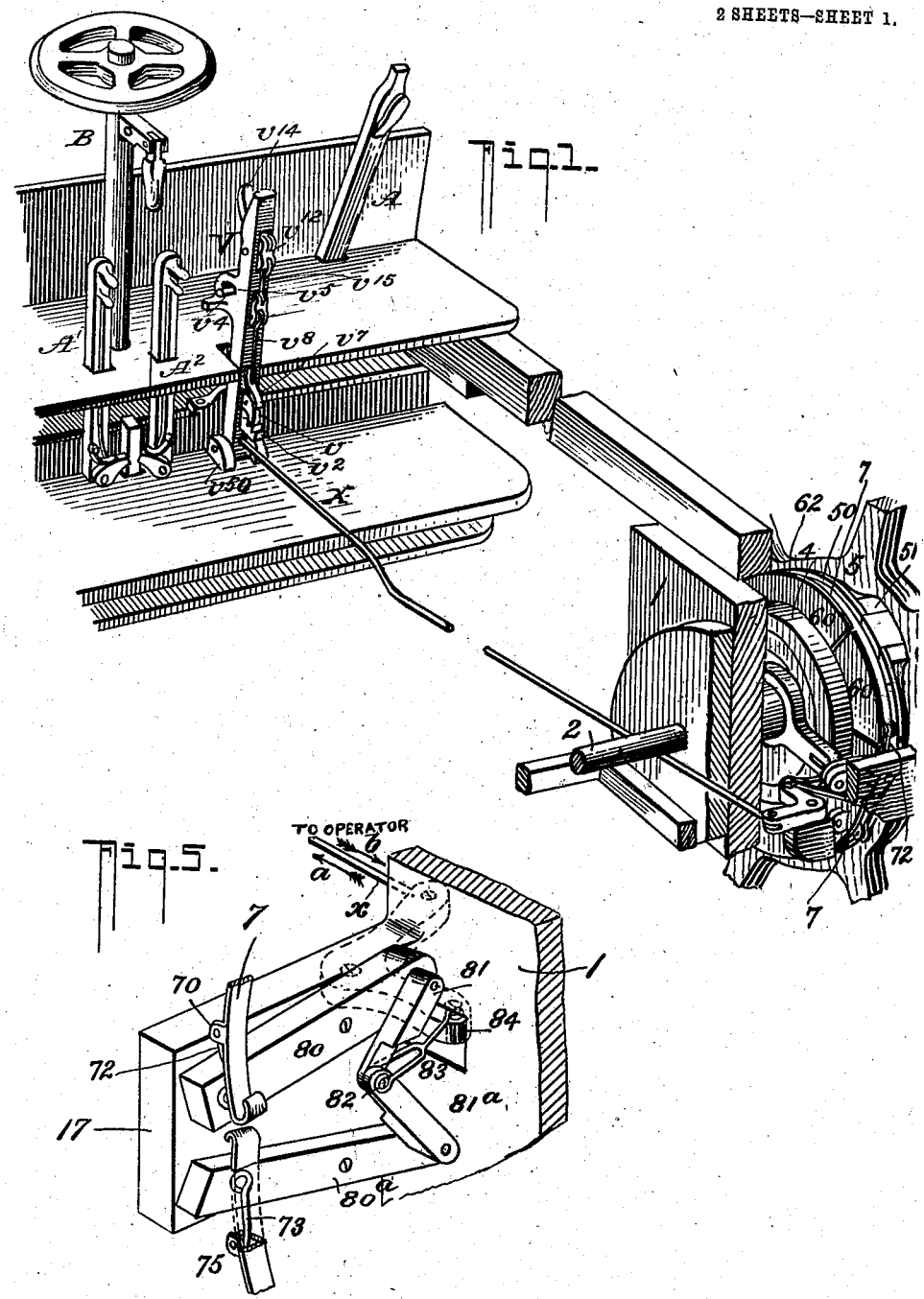
WITNESSES:  
Hayward Woodard  
John T. Schrott
INVENTOR  
Robert H. Bowman  
BY  
Fred G. Dieterich  
ATTORNEYS

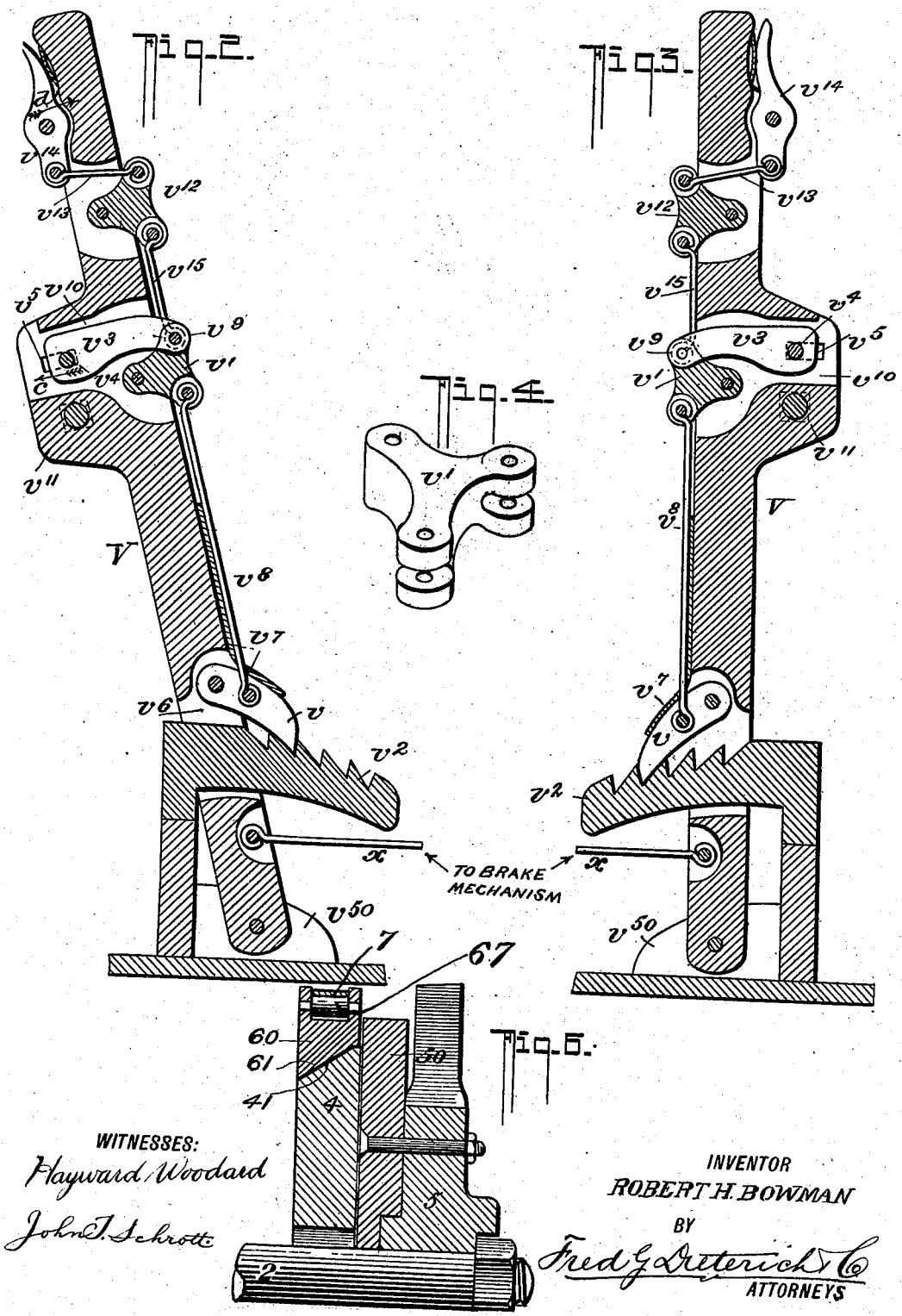

UNITED STATES PATENT OFFICE.

ROBERT H. BOWMAN, OF CANON CITY, COLORADO.

BRAKE-ACTUATING-LEVER MECHANISM.

No. 894,936.  Specification of Letters Patent.  Patented Aug. 4, 1908.

Application filed March 10, 1908. Serial No. 420,276.

*To all whom it may concern:*

Be it known that I, ROBERT H. BOWMAN, residing at Canon City, in the county of Fremont and State of Colorado, have invented a new and Improved Brake-Actuating-Lever Mechanism, of which the following is a specification.

My present invention has for its object to provide an improved construction of lever mechanism that is operated by foot or hand manipulation, and it is more particularly designed for use in connection with brake mechanisms for motor vehicles and especially to be used in connection with the clutch and brake mechanism disclosed in my copending application filed Feb. 17, 1908, Serial No. 416,310 and which forms a part of the complete motor vehicle construction disclosed in another copending application filed by me on the 11th day of March 1908 Serial No. 420,486 and my said present invention consists in certain details of construction and novel arrangement of parts, all of which will be hereinafter described, specifically pointed out in the appended claims and illustrated in the accompanying drawings, in which, Figure 1, is a perspective view of my improved lever mechanism combined with the brake mechanism. Fig. 2, is a vertical section of the lever devices showing them positioned for pulling on the brake rod for applying the brake. Fig. 3, is a similar view that shows the parts positioned for "releasing" the brake rod. Fig. 4, is a detail view of one of the triangular lever devices hereinafter specifically referred to. Fig. 5, is a detail view of the devices for drawing up the ends of the brake band and which are controlled by the brake rod actuated by my improved lever mechanism. Fig. 6 is a detail section of a part of the brake mechanism.

In the accompanying drawings, I have shown my present invention as combined with a special form of brake devices for a motor wheel, since my said invention is more especially designed for use in connection with the said brake mechanism, but I desire it understood that it may be used in connection with any other type of brake mechanism adapted for being applied and released by the pull on and relaxing of a brake rod.

The brake mechanism, the construction of which is generally disclosed in Figs. 1 and 5 embodies a disk 4 that is keyed onto the axle 2 that carries the loosely mounted wheel 5, and which has an inner solid or friction face 50, for coacting with the disk 4, that is slidable on the shaft 2 and which has beveled periphery 41 with which engages a series of segmental brake shoes 60 that are fulcrumed on the rim 51 of the friction face 50 and which have their friction faces 61, beveled for engaging the beveled rim 41, the several parts being so constructed that when the segmental brake shoes 60 are drawn inwardly, they force the brake disk outwardly against the friction face 50 of the wheel and thereby lock it together with the wheel 5 to turn on the axle.

For tightening the several brake shoes in unison against the friction disk 4, a metal strap or brake band 7, is used that fits in an annular groove 62 formed on the several brake shoes 60 and which rides on roller bearings 67, mounted in the said groove 62, as shown.

One end of the band 7 has ears 70, in which is hinged a link 72, the other end of the band 7 also having ears 75 in which is hinged a link 73, the latter as also the link 72, being pivotally connected with a pair of lever members 80—80$^a$ that are pivotally mounted on the bracket 17 of the main frame 1, as best shown in Fig. 5 from which it will be understood that the pivotal connection of the levers 80 and 80$^a$ is such that closing the outer ends of the levers draws upon the ends of the band 7 and thereby applies the brake shoes 60 whereas the spreading of said ends relaxes the clamping tension of the said band 7.

The opening and closing of the members 80—80$^a$ is controlled by the shifting of the brake rod controlled by my improved lever mechanism, which will be presently described in detail and which forms the essential of my present invention.

To the inner ends of the members 80—80$^a$ are pivotally joined a pair of toggle links 81—81$^a$, pivotally joined together at one end on a pivot bolt 82 and pivoted at their other ends to the members 80—80$^a$ as shown.

Joined to the bolt 82 is a forked link rod 83 that connects with one end of a bell crank lever 84 fulcrumed on the main frame 1 and to the other end of which connects the brake rod $x$, the other end of which joins with the lever devices presently described, the connections that join the band 7 with the rod $x$, being such that a pull strain on rod $x$ in the direction of the arrow $a$ applies the brake band 7 while the relaxing or movement of the rod in the direction of an arrow $b$ releases the brake pressure.

The lever mechanism, best illustrated in Figs. 1—3—4 in the practical application thereof, is mounted on the front frame or dash board end of the motor vehicle and it extends up from the platform so it may be conveniently operated by foot or hand power. The lever mechanism which generally is designated $v$ in the drawings consists of a bar pivotally connected at the lower end between the brackets $v^{50}$ on the platform, as best shown in Figs. 2 and 3 by reference to which it will be also seen that the brake rod $x$ is connected to the lever just above its pivoted end, and above the rod connection the bar has a transverse slot $v^6$ in which is pivoted a latch pawl $v$, that is pressed by the spring $v^7$ to normally engage a segmental rack $v^2$ mounted on the platform or frame base projected through the slot $v^6$.

With the latch pawl $v$ connects a lift rod $v^8$ that joins with the lower end of a triangular shaped lever $v'$ fulcrumed in another transverse slot on the lever bar and within which the said lever $v'$ is fulcrumed, its upper end being forked for receiving the outer end $v^9$ of a block $v^3$ slidably held in the slot $v^{10}$, it having a lateral extension $v^4$ that extends through a horizontal slot $v^5$ in the bracket extension $v''$ of the lever bar, see Figs. 1 and 3 the said member $v^4$ forming a convenient member for being engaged by the foot of the operator, since foot pressure against the said member $v'$ in the direction indicated by the arrow $c$ will rock the triangular lever to the position shown in Fig. 2 and thereby lift the pawl $v$ from engagement with the segmental rack and thus admit of swinging the lever bar to pull or push on the brake rod as desired.

To release the latch pawl by hand a lift rod $v^{15}$ is connected to the upper end of the triangular lever which connects with a second triangular shaped lever $v^{12}$ pivoted in a slot in the upper end of the lever bar to the upper end of which connects the link rod $v^{13}$ that joins with the usual type of hand lever $v^{14}$ pivoted on the upper end of the main lever, and which when pressed inwardly in the direction of the arrow $d$, rocks the triangular lever and thereby raises the latch pawl from the rack.

From the foregoing taken in connection with the drawings the complete construction, the manner of operation and advantages of my invention will be readily apparent.

In the drawing I have shown other lever mechanisms designated A, A', A² which are provided for actuating the transmission or speed gearing of my complete motor vehicle construction disclosed in my copending application before referred to, and B designates the steering wheel, which as also the lever mechanism A, A', A², are located on the front platform adjacent the brake lever mechanism $v$ so that all of the said lever and steering wheel mechanisms may be actuated by a single operator.

What I claim is:—

1. A brake controlling lever mechanism, comprising a brake rod, a pivoted lever bar to which the rod connects, a fixed rack, a latch pawl mounted on the lever bar for engaging the rack, a lift rod for the pawl, a lever mounted pivotally on the bar, one end of which connects with the lift rod, a block slidable on the lever bar and having an arm that pivotally connects with the other end of said last named lever, said block having a laterally projected extension for being engaged by the foot of the operator.

2. A brake controlling lever mechanism, comprising a brake actuating rod, a pivoted lever bar to which the rod connects, a fixed rack, a latch pawl mounted on the lever bar for engaging the rack, a lift rod for the pawl, a triangular shaped lever mounted pivotally on the bar, one end of which connects with the lift rod, a block slidable on the lever bar and having an arm that pivotally connects with the other end of the triangular lever, said block having a laterally projected extension for being engaged by the foot of the operator.

3. A brake rod controlling mechanism, comprising a lever bar pivotally mounted at its lower end, and having a connection for the brake rod above its fulcrum, said bar having an upper and lower slotway and a third slotway between the upper and lower slotways, a fixedly held segmental rack that projects through the lower slotway in the lever, a spring pressed latch pawl mounted in the said lower slotway that engages the rack, a triangular shaped lever pivotally mounted on each of the intermediate and upper slotways, a link rod that connects the two triangular levers, another link rod that connects the lower triangular lever with the latch pawl, a hand lever at the upper end of the main lever bar, having a link rod connection with the upper triangular lever and a block slidable in the intermediate slotway of the lever bar, said block having an arm connected to the upper end of the lower triangular lever and having a lateral extension arranged to be engaged by the foot of the operator for the purposes described.

ROBERT H. BOWMAN.

Witnesses:
  Mrs. H. R. McQuown,
  J. T. Corrin.